United States Patent [19]
Linhart et al.

[11] 3,848,920
[45] Nov. 19, 1974

[54] CARGO DEFLECTOR PANEL

[76] Inventors: James T. Linhart, 203 W. Hickey, Lombard, Ill. 60148; Flay D. Crosswell, 309 Lafayette; Gerald W. Galbreath, 787 Irvin Shoots Rd., both of Marion, Ohio 43302

[22] Filed: Oct. 3, 1972

[21] Appl. No.: 294,687

[52] U.S. Cl. ............... 296/106, 160/201, 160/209
[51] Int. Cl. ................................. B62d 25/06
[58] Field of Search ...... 296/106, 50; 160/201, 209, 160/113, 189

[56] References Cited
UNITED STATES PATENTS

| | | | |
|---|---|---|---|
| 2,855,989 | 10/1958 | Pritchard | 296/106 |
| 3,109,483 | 11/1963 | Merril | 160/209 |
| 3,118,702 | 1/1964 | Kale | 296/106 |

Primary Examiner—Robert R. Song
Attorney, Agent, or Firm—Roy E. Petherbridge; Robert L. Lindgren; Edward D. Gilhooly

[57] ABSTRACT

A conventional truck trailer is provided with a sectional door which is rollingly supported in substantially L-shaped tracks mounted on the side wall of the trailer. The door is movable from a closed vertical position wherein it is disposed in vertical track portions, to an open horizontal position wherein it is supported on horizontal track portions disposed adjacent the top wall of the trailer. The present invention provides a false ceiling extending between the side walls of the trailer and disposed directly below the horizontal track portions, which false ceiling extends to a point adjacent to but spaced from the door when same is in its closed position. A substantially rectangular deflector panel has one edge thereof pivotally connected to the top panel of the door, with the other edge thereof being rollingly supported on the guide tracks. The deflector panel is disposed at an angle relative to the door when same is in its closed position, whereby said other edge is positioned adjacent the end of said false ceiling. The deflector panel and false ceiling prevent the cargo from entering into the space between the tracks when the door is closed.

29 Claims, 6 Drawing Figures

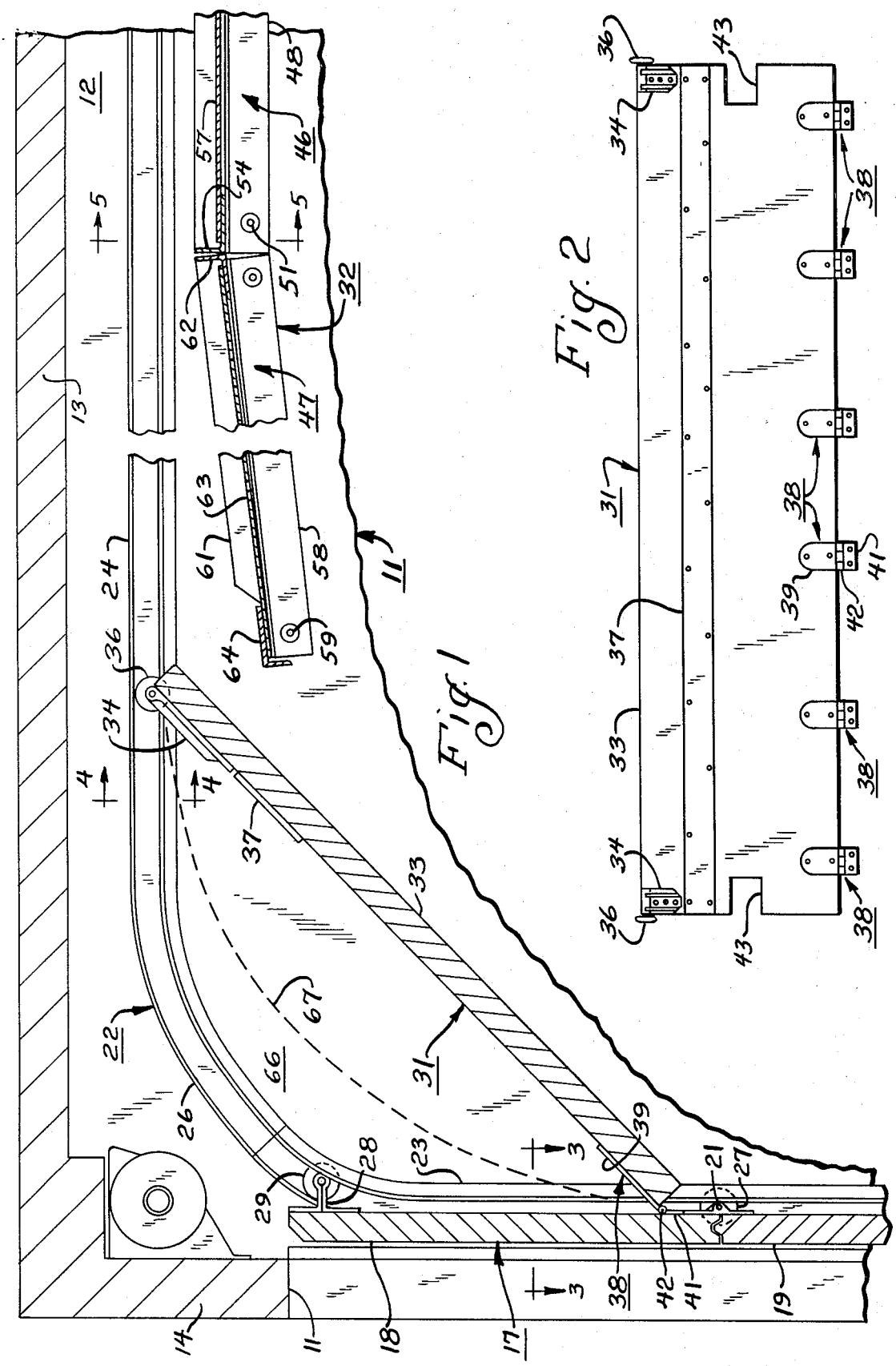

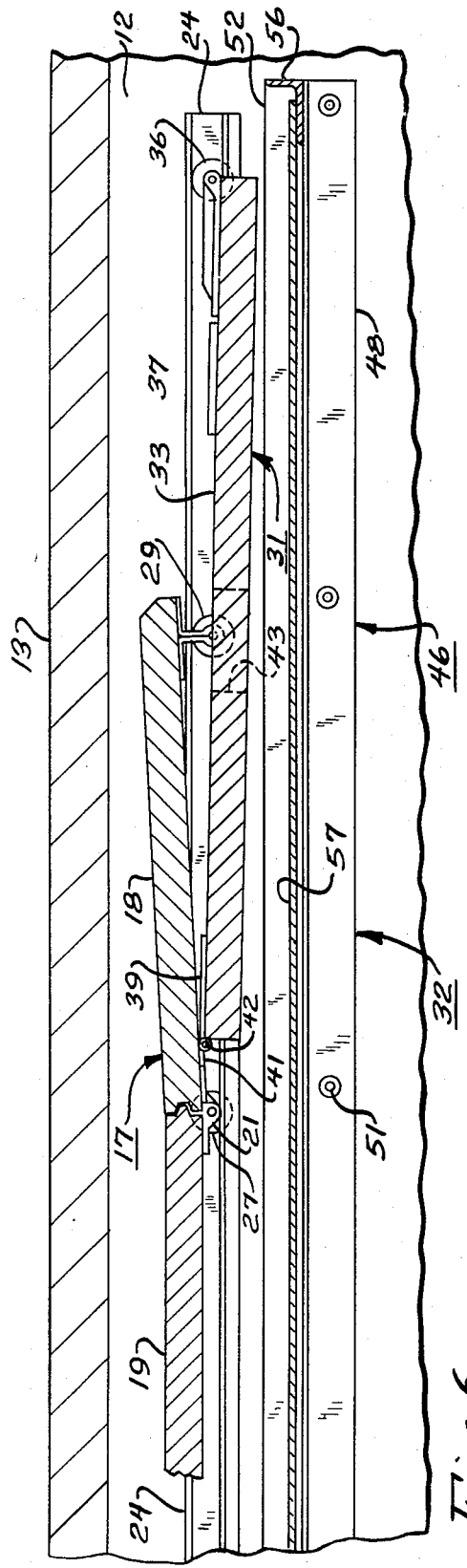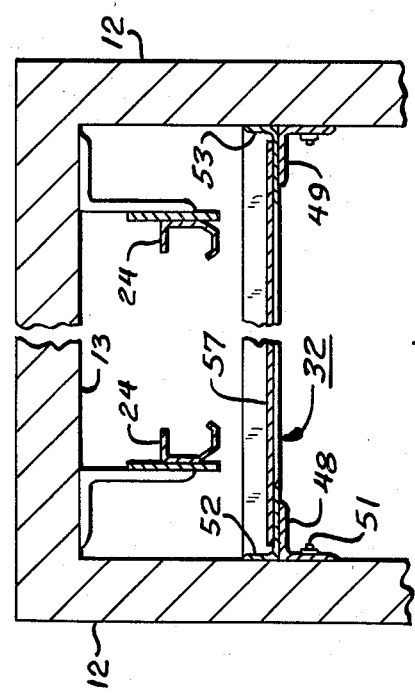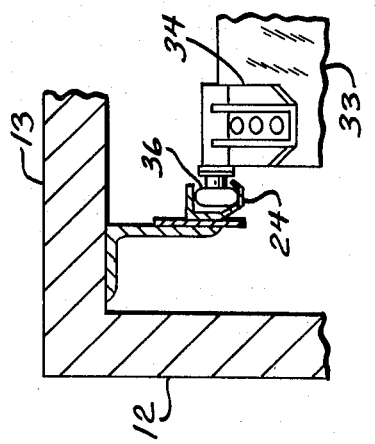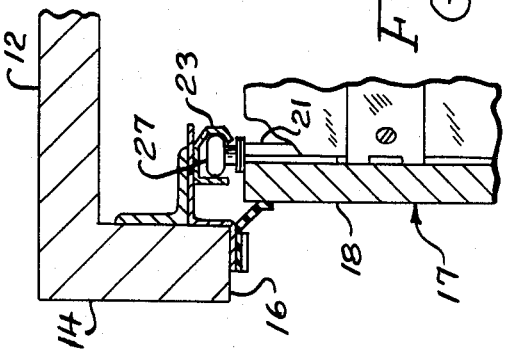

CARGO DEFLECTOR PANEL

FIELD OF THE INVENTION

This invention relates to closures for the access openings of vehicle bodies and, in particular, to a closure deflector element for preventing the contents of the vehicle body from interfering with the free opening of the closure.

BACKGROUND OF THE INVENTION

This invention relates to a closure including a deflector system designed to be mounted in the access opening of a vehicle body such as a truck trailer. The closure of the invention includes what is commonly known as an overhead door with a deflector system actuated by the movement thereof.

One of the problems which has long existed with truck trailers utilizing overhead doors has been the difficulty encountered in opening the door when the load or cargo contained within the trailer has shifted up against the top portion of the closed door. Particularly, when a trailer is filled with boxes or the like, the transporting of the trailer often results in shifting of one or more of the boxes, so that some of the boxes become positioned within the space between the horizontal tracks which extend into the rear of the trailer adjacent the top wall thereof. Accordingly, when an attempt is made to open the rear door, the boxes disposed between the horizontal track portions prevent the door from being moved into its fully open position. Further, it has been observed that when this problem is encountered, the truck terminals often utilize a lift truck to lift against the bottom panel of the door to forcibly open same. This often results in breakage of the door rollers, distortion of the track, breakage of the door hinges, and the like.

It is an object of the present invention to provide a closure including an articulated door and deflector system designed for installation in the access opening of a Vehicle body such as a truck trailer to facilitate opening of the closure under substantially all load conditions. Accordingly, it is an object of the present invention to provide:

1. A deflector system, as aforesaid, which includes a deflector panel which extends across the width of a truck trailer and has the one edge thereof pivotally connected to an upper portion of the articulated door, with the opposite edge of the deflector panel being rollingly supported on the horizontal portions of the guide tracks, whereby the deflector panel extends upwardly and inwardly relative to the trailer when the door is in its closed position to prevent the cargo from being positioned where it will engage the upper edge of the door as same is moved into its open position.

2. A deflector system, as aforesaid, wherein a false ceiling extends between the trailer sidewalls and is disposed directly below the horizontal track portions, which false ceiling prevents cargo from being moved upwardly into the space between the horizontal track portions.

3. A deflector system, as aforesaid, wherein the false ceiling extends rearwardly of the truck trailer to a point spaced forwardly of the door when same is closed, with said false ceiling terminating at a location closely adjacent the upper free edge of the deflector panel when the door is closed.

4. A deflector system, as aforesaid, wherein the deflector panel is pivotally connected to the top section of the door at a location disposed closely adjacent to but slightly above the hinge which interconnects the top section of the door to the next lower section of the door.

5. A deflector system, as aforesaid, wherein the deflector panel and the top section of the door overlap and substantially nest relative to one another when the door is in its open position.

6. A deflector system, as aforesaid, wherein the deflector panel extends at a substantial angle relative to the door when same is in its closed vertical position so that movement of the door to its open position causes the deflector panel to be continually moved upwardly relative to the cargo to permit free opening movement of the door even though the cargo may have shifted into engagement with the deflector panel when the door is in its closed position.

7. A deflector system, as aforesaid, which can be readily and economically attached to conventional trailers having conventional sectional doors associated therewith.

8. A deflector system, as aforesaid, which is economical to manufacture and install, and which is substantially free of maintenance.

Other objects and purposes of the present invention will be apparent to persons acquainted with devices of this type upon reading the following specification and inspecting the accompanying drawings.

BRIEF DESCRIPTION OF THE DRAWINGS

FIG. 1 is a broken elevational view taken partially in cross section and illustrating the rearward end of a truck trailer, same being provided with a deflector system according to the present invention associated with the sectional door.

FIG. 2 is a plan view taken on a reduced scale and illustrating the deflector panel constructed according to the present invention.

FIG. 3 is a fragmentary sectional view taken substantially along the line III—III of FIG. 1.

FIG. 4 is a fragmentary sectional view taken along the line IV—IV of FIG. 1.

FIG. 5 is a fragmentary sectional view taken along the line V—V of FIG. 1.

FIG. 6 is a fragmentary elevational view taken in cross section and illustrating the door in its open horizontal position.

Certain terminology will be used in the following description for convenience in reference only. For example, the words "rightwardly" and "leftwardly" will refer to directions in the drawings to which reference is made. The word "front" will refer to the exterior surface of the door, same being the left side as appearing in FIG. 1, whereas the word "rear" will refer to the interior surface of the door, same being viewed from the right side of FIG. 1. The words "inwardly" and "outwardly" will refer to directions toward and away from, respectively, the geometric center of the system and designated parts thereof. Said terminology will include the words above specifically mentioned, derivatives thereof and words of similar import.

SUMMARY OF THE INVENTION

In general, the objects and purposes of the present invention are met by providing a substantially rectangular deflector panel having a width substantially equal to the width of the door. The deflector panel has the lower edge thereof pivotally connected to the upper portion of the door, with the other edge of the deflector panel being provided with rollers thereon which are rollably supported on the door guide tracks. The deflector panel, in the preferred embodiment, has the lower edge thereof pivotally connected to the upper section of the door at a location disposed closely adjacent but slightly above the axis of the hinge structure which connects the two uppermost door panels. The deflector panel preferably extends at a substantial angle relative to the door when same is in its closed position, such as at an angle of approximately 45° relative to the door, so that the rollers provided on the upper edge of the door are maintained within the horizontal track portions, even when the door is closed. The deflector panel and the uppermost door panel substantially overlap and nest relative to one another when the door is moved into an open overhead position wherein it is disposed on the horizontal track portion. A false ceiling is mounted within the trailer directly below the horizontally extending track portions, which false ceiling extends throughout the length of the horizontal track portions but terminates at a location close to but spaced inwardly from the inner surface of the door when same is in its closed position. The upper edge of the deflector panel, when the door is closed, is preferably disposed closely adjacent the terminal edge of said false ceiling, whereby movement of the door to its open position causes the deflector panel and the door to enter into the space between the false ceiling and the top wall of the trailer.

DETAILED DESCRIPTION

FIG. 1 illustrates therein a portion of a conventional truck trailer 11 which includes opposed sidewalls 12 (FIG. 5) interconnected by a top wall 13 and having a rear wall 14 containing a conventional door opening 16 therein. A movable door 17 is disposed for closing the opening 16 in a conventional manner. The door 17 is preferably of the articulated type and includes a plurality of panels or sections hingedly connected together in a conventional manner. In the illustrated embodiment, the door 17 includes a top panel 18 interconnected to an intermediate panel 19 by a conventional hinge mechanism 21.

The door 17 is rollingly supported on a pair of conventional L-shaped tracks 22 which are secured adjacent the opposite sidewalls 12. Each track 22 includes a vertical track portion 23 disposed adjacent the door opening 16, a horizontal track portion 24 extending into the interior of the truck and positioned adjacent the top wall 13, and an arcuate track portion 26 extending between and interconnecting the vertical and horizontal track portion 23 and 24, respectively.

The guide tracks 22 for the door 17 are of substantially channel shaped cross-section, with the opposite guide tracks opening toward one another to receive therein rollers which are supported on the door adjacent the opposite edges thereof. The door 17, as illustrated in the drawings, includes a first pair of rollers 27 disposed adjacent the opposite edges of the door, which rollers are rotatably supported by the hinge assemblies 21 which pivotally interconnect the door panels 18 and 19. The uppermost or top door panel 18 is also provided with a pair of brackets 28 on the inner surface thereof adjacent the opposite upper corners of the panel, which brackets 28 in turn rotatably support thereon a pair of further guide rollers 29. The door is additionally provided with further coacting pairs of rollers located at the hinges which interconnect the remaining door panels, with a further pair of rollers being provided adjacent the lower edge of the lowermost door panel. This structure is conventional and has not been illustrated in the drawings. All of the rollers as supported on the door 17, including the rollers 27 and 29, are rollingly supported and confined within the channel-shaped guide tracks 22 whereby the door is thus movable from a closed vertical position, as illustrated in FIG. 1, to an open horizontal position wherein it is disposed closely adjacent the top wall of the trailer, substantially as illustrated in FIG. 6. However, it should be noted that the axis of the rollers 29 as associated with the upper edge of the top panel 18 is spaced rearwardly of the door by a distance greater than the spacing of the axis of the rollers 27 from the rear surface of the door, whereby the uppermost rollers 29 are thus disposed in the lower part of the arcuate track portions 26 when the door is in its closed position as illustrated in FIG. 1.

The structure of the door 17 and of the guide tracks 22 associated therewith, as briefly described, is conventional and thus further description of same is not believed necessary.

The present invention relates to an improved deflector system disposed for association with the door 17 and the guide tracks 22 for preventing the cargo or load as contained within the trailer 11 from interfering with the movement of the door 17 between its open and closed positions. For this purpose, the deflector system of the present invention includes a deflector means 31 which is associated with the door 17 for movement therewith, and a false ceiling 32 which is stationarily mounted on the trailer 11 directly below the top wall 13.

Considering first the deflector means 31, same includes a substantially rectangular deflector panel 33 having a width approximately equal to the width of the door 17. A pair of mounting brackets 34 are fixedly secured to the deflector panel 33 adjacent the upper corners thereof, which brackets 34 rotatably support thereon guide rollers 36. The rollers 36 are disposed within the horizontal track portion 24 for movement therealong. The deflector panel 33 also has a plate-like stiffening gusset 37 fixedly secured thereto and extending transversely thereacross adjacent the upper edge of the panel.

The lower edge of the deflector panel 33 is provided with a plurality of hinge assemblies 38 for permitting the deflector panel 33 to be pivotally connected to the upper portion of the door 17, the panel 33 being specifically and preferably connected to the upper door panel 18. Each hinge assembly 38 includes a pair of hinge leaves 39 and 41 interconnected by a conventional hinge pin 42. The hinge leaves 39 are fixedly secured to the deflector panel 33, whereas the hinge leaves 41 are fixedly connected to the upper door panel 18. The hinge assemblies 38 are preferably interconnected to the upper door panel 18 at a location which is disposed closely adjacent to but spaced slightly upwardly from the lowermost edge of the door panel 18, whereby the hinge axis of the hinge assemblies 38, as defined by the hinge pins 42, are thus spaced upwardly a small distance above the hinge axis defined by the hinge mechanism 21. This spacing between the axes of the hinge assembly 38 and the hinge mechanism 21 is, in a practical embodiment of the invention, approximately three inches.

The deflector panel 33 is also provided with a cut-out or recess 43 formed in each side thereof, which recesses are spaced downwardly a small distance from the upper edge of the panel 33. The cut-outs 43 permit the deflector panel 33 and the upper door panel 18 to overlap and nest relative to one another when in the closed position illustrated in FIG. 6, whereby the upper rollers 29 as provided on the upper door panel 18 then extend into the cut-outs 43.

The false ceiling 32, as illustrated in FIGS. 1, 5 and 6, includes a main ceiling section 46 disposed directly beneath and substantially parallel with the horizontal track portions 24, and a rear ceiling section 47 (FIG. 1) disposed between the door 17 and the main ceiling section 46. The rear ceiling section 47, as it extends toward the door 17, is inclined downwardly so as to diverge relative to the horizontal track portions 24. The free end of the rear ceiling section 47, namely the leftward end in FIG. 1, is disposed in the vicinity of the junction between the horizontal track section 24 and the arcuate track section 26, whereby the free end of the rear ceiling section 47 is thus spaced a substantial distance from the inside surface of the door 17 when same is in its closed position.

To support the false ceiling within the interior of the truck trailer, there is provided a pair of support angles 48 and 49 (FIG. 5) fixedly secured to the opposite sidewalls 12 of the trailer. The support angles 48 and 49 are fixed to the sidewalls 12 by any conventional means, such as screws 51. The support angles 48 and 49 are disposed directly below and substantially parallel to the horizontal track portions 24 and support thereon a substantially rectangular frame which includes a pair of opposed side members 52 and 53 fixedly connected by a pair of end members 54 and 56. The rectangular frame defined by the members 52, 53, 54 and 56 supports therein a rectangular partition 57 which effectively functions as a false ceiling.

The rear ceiling section 47 is of similar construction and also includes a pair of support angles 58 fixedly secured to the opposed sidewalls 12 by means of screws 59. However, the support angles 58, as illustrated in FIG. 1, diverge relative to the horizontal track portion 22 as they extend rearwardly of the trailer toward the door opening 16. The rear ceiling section 47 also includes a substantially rectangular frame supported on the support angles 58, which rectangular frame includes a pair of opposed side members 61 interconnected by end members 61 and 64. The frame defined by the side members 61 and the the end members 62 and 64 also supports therein a substantially rectangular partition 63 which also functions as a false ceiling. The end member 64, as illustrated in FIG. 1, comprises an angle which has its horizontal flange disposed on top of the partition 63, with the vertical flange of the end member 64 extending downwardly over the free edge of the partition 63 to thus protect same and to provide for increased clearance over the end members 64 to facilitate movement of the door 17 and of the deflector panel 33 between open and closed positions.

The partitions 57 and 63 are preferably provided with a gratelike construction, as by being of expanded metal, such as aluminum.

The deflector panel 33, when the door 17 is in its closed position as illustrated in FIG. 1, preferably extends at a substantial angle relative to the door so that the panel thus extends upwardly and inwardly relative to the trailer whereby the upper edge of the deflector panel 33, as supported by the rollers 36, is thus disposed in the horizontal track portion 24 substantially directly above the rearward edge of the false ceiling 31, as defined by the end member 64. The panel 33 preferably extends at an angle of approximately 45° relative to the vertical plane defined by the inside surface of the door 17 when same is in its closed position, whereby movement of the door 17 into its open overhead position results in an upward swinging movement of the panel 33 (clockwise in FIG. 1) about the axis of the guide rollers 36 simultaneous with the horizontal movement of the rollers 36 (rightwardly in FIG. 1) along the horizontal track portions 24. Thus, the deflector panel 33 undergoes a substantial vertical swinging movement in an upward direction as the door 17 is moved into its open overhead position, whereby the deflector panel is thus not subject to being wedged tightly against the contents or load contained within the interior of the trailer 11.

OPERATION

The operation of the deflector assembly according to the present invention, and its relationship to the conventional structure, will be briefly described below to insure a complete understanding thereof.

Assuming that the door is in its closed vertical position as illustrated in FIG. 1, then the deflector panel 33 will be disposed so as to extend at a substantial angle relative to the door, whereupon the upper edge of the deflector panel is thus positioned substantially directly over the free edge of the false ceiling 32. The guide rollers 36 as provided on the upper edge of the deflector panel 33 are thus maintained in rolling engagement with the horizontal track portion 24. The deflector panel 33 thus maintains the space or area 66 under the arcuate track portions 26 free of cargo, and prevents the cargo from becoming lodged or wedged against the upper portion or upper edge of the door 17. Since the upper edge of the deflector panel 33 is disposed substantially directly over the free edge of the false ceiling 32, this also prevents the cargo from coming wedged against the upper edge of the deflector panel 33. Thus, if any shifting of the cargo should occur during transporting of the trailer, the cargo will be able to contact only the lower portion of the door 17 or the lower inner surface of the deflector panel 33. However, since the lower portion of the door is movable solely in a vertical direction when being moved to its open position, any cargo contacting same will not be effective in restricting or preventing the door from being opened. Likewise, since the deflector panel 33 pivotally swings upwardly (clockwise in FIG. 1) about the axis of the rollers 36 as the door is moved into its open position, this movement results in the deflector panel being moved away from any cargo which may have contacted the inner surface thereof, whereby the deflector panel 33 is also thus freely movable into its open position.

When the door 17 is moved from its closed vertical position of FIG. 1 into its open horizontal position of FIG. 6, the initial opening movement of the door will cause the lower edge of the deflector panel 33, as defined by the hinge pin 42, to be moved along the path 67 illustrated by a dash-dash line in FIG. 1. This path, illustrated in FIG. 1, produces an initial deflector panel movement which is directed essentially vertically upwardly to initially clear the deflector panel from engagement with cargo which may have become wedged against it in transit. After the initial, essentially vertical movement of the deflector panel, the continued upward movement of the door results in a simultaneous upward and inward movement of the deflector panel as is illustrated by the arcuate broken line 67 in FIG. 1. This further insures that the deflector panel is moved away from any cargo which may have wedged thereagainst so that the door can thus be freely opened. Further, as the door 17 approaches its fully opened position, the panel 33 and the top door panel 18 pivotally wing toward one another inasmuch as they both have their upper edges rollingly guided on the horizontal track portion 24. The top door panel 18 and deflector panel 33 thus substantially overlap and partially nest one within the other inasmuch as the upper guide rollers 29 as provided adjacent the upper edge of the top door panel 18 substantially extend into the cutouts 43 as provided adjacent the opposite sides of the deflector panel 33. This overlapped and nested relationship of the panels 18 and 33 when the door is in its open position is fully illustrated in FIG. 6.

The structure of the present invention, namely the use of the movable deflector means 31 and the stationary false ceiling 32, thus insures that the cargo cannot be inadvertently shifted during transporting of same into a location where it will block the opening movement of the door 17. This thus greatly simplifies and facilitates the opening of the door 17, and likewise prevents the door and its associated hardware from being damaged due to a forcible opening of same when the door is jammed.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property of privilege is claimed are defined as follows:

1. In a truck trailer having a pair of substantially vertical side walls and top and bottom walls connected between said side walls, the rear of said trailer defining an access opening into the interior thereof, a pair of substantially L-shaped guide tracks mounted on the walls of said trailer, said guide tracks including substantially vertical track portions disposed adjacent the opposite sides of said access opening and substantially horizontal track portions extending inwardly into the interior of said trailer adjacent the upper edge of said access opening, said vertical and horizontal track portions being interconnected by arcuate track portions, and a door unit slidably supported on said guide tracks and movable between a closed vertical position wherein said door unit is disposed within said vertical track portions for closing said access opening and an open substantially horizontal position wherein said door unit is supported on said horizontal track portions for uncovering said access opening, said door unit including a plurality of door panels horizontally hinged together to permit relative pivotal movement therebetween as the door moves between its open and closed positions, the improvement comprising:

deflector means associated with said door unit for preventing the cargo contained within said trailer from interfering with the upper edge of said door unit as same is being moved from its closed to its open position, said deflector means including a deflector panel extending laterally across the width of said door, said deflector panel being disposed at an angle relative to said door unit when same is in said closed position, one edge of said deflector panel being disposed adjacent the door unit and means pivotally connecting said one edge of said deflector panel to the upper portion of said door unit, the other edge of said deflector panel being disposed adjacent said horizontal track portions, and means associated with said deflector panel adjacent said other edge for slidably supporting same on said horizontal track portions.

2. A trailer according to claim 1, wherein said one edge of said deflector panel is pivotally connected to the uppermost panel of said door unit.

3. A trailer according to claim 2, wherein said one edge of said deflector panel is pivotally connected to the uppermost door panel at a location spaced downwardly a substantial distance from the uppermost edge thereof.

4. A trailer according to claim 3, wherein said uppermost door panel and said deflector panel partially overlap and partially nest relative to one another when said door is in its open horizontal position.

5. A trailer according to claim 1, wherein the plane of said deflector panel extends upwardly and inwardly relative to said door unit at an angle which lies between 35° and 55° relative to the plane defined by said door unit when same is in said closed vertical position.

6. A trailer according to claim 1, further including false ceiling means extending between said side walls at an elevation directly below said horizontal track portions, the rearward end of said false ceiling means terminating at a predetermined distance from the inner surface of said door unit when same is in said closed vertical position, said other edge of said deflector panel being disposed above and in the vicinity of the rearward edge of said false ceiling means when said door unit is in said closed vertical position.

7. A trailer according to claim 6, wherein said one edge of said deflector panel is pivotally connected to the uppermost panel of said door unit at a location spaced upwardly a small distance from the hinge structure which interconnects the two uppermost door panels.

8. In a truck trailer having an access opening therein and a movable door associated with said access openings for closing same, said door being movable from a closed substantially vertical position wherein the door closes said access opening and an open substantially horizontal position wherein said door is disposed substantially horizontally within the interior of said trailer at an elevation adjacent the upper edge of said access opening, the improvement comprising:

partition means associated with said trailer for preventing the cargo disposed within the interior of said trailer from blocking the movement of said door from its closed to its open position, said partition means being inclined at an angle relative to a plane defined by said door when said door is in its closed vertical position, said partition means having a substantial depth with one edge thereof being disposed closely adjacent the inside surface of said door when same is in its closed vertical position, the opposite edge of said partition means being horizontally spaced a substantial distance from the inside surface of said door, said partition means also extending transversely across the width of said trailer and having a width at least approximately equal to the width of said door, said partition means extending inwardly into the interior of said truck trailer from a location adjacent the upper edge of said access opening but being disposed at an elevation below the elevation of said door when same is in its open horizontal position.

9. A trailer according to claim 8, wherein said partition means includes a partition member positioned adjacent the inside surface of said door and means mounting said partition member for substantially vertical swinging movement relative to said trailer, said partition member extending inwardly into the interior of said trailer away from said access opening.

10. A trailer according to claim 9, wherein said partition means includes a further panel member fixedly connected to and extending between the side walls of said trailer at an elevation closely adjacent but slightly below the elevation of said door unit when same is in its open horizontal position, said further panel member being spaced inwardly in the interior of said trailer a substantial distance from said access opening, said first-mentioned panel member being disposed in the space between said further panel member and said access opening at least when said door is in said closed vertical position.

11. In a truck trailer having wall means defining an access opening into the interior thereof, a pair of substantially L-shaped guide tracks mounted on the wall means, said guide tracks including substantially vertical track portions disposed adjacent the opposite sides of said access opening and substantially horizontal track portions extending inwardly into the interior of said trailer adjacent the upper edge of said access opening, said vertical and horizontal track portions being interconnected by arcuate track portions, and a door unit slidably supported on said guide tracks and movable between a closed vertical position wherein said door unit is disposed within said vertical track portions for closing said access opening and an open substantially horizontal position wherein said door unit is supported on said horizontal track portions for uncovering said access opening, said door unit including a plurality of door panels horizontally hinged together to permit relative pivotal movement therebetween as the door moves between its open and closed positions, the improvement comprising:

partition means disposed within the interior of said trailer in the vicinity of the upper edge of said access opening for preventing the cargo located within the interior of said trailer from blocking movement of said door from its closed position to its open position;

said partition means including a first partition member having a width at least approximately equal to the width of said door and means mounting said first partition member in the vicinity of the upper edge of said access opening when said door is in said closed vertical position, said first partition member extending at a substantial angle relative to a vertical plane defined by said access opening, said first partition member being disposed below said arcuate track portions for isolating the space defined within said arcuate track portions from the cargo located within the interior of said trailer; and said partition means including a second partition member having a width at least approximately equal to the width of said door and means fixedly mounting said second partition member relative to said wall means at an elevation closely adjacent but directly below the horizontal track portions, said second partition member being spaced inwardly within said trailer a substantial distance from said access opening.

12. A trailer according to claim 11, wherein said means supporting said first partition member permits same to vertically swing relative to the wall means of said trailer.

13. A vehicle body comprising walls defining an enclosure and providing an access opening into the interior of the enclosure, guide means disposed adjacent the access opening of the vehicle body and extending inwardly from the access opening into the interior of the enclosure, an articulated door disposed for sliding engagement with the guide means between closed and opened positions, and a deflector panel extending across a portion of the access opening, one edge of the deflector panel being pivotally connected to the upper portion of the articulated door, a second edge of the deflector panel being provided with slide means for supporting the deflector panel in sliding engagement with a portion of the guide means whereby the upper portion of the articulated door is shielded from the contents of the enclosure when the door is in closed position and the door and deflector panel are freely movable relative to the access opening when the door is not closed.

14. A vehicle body according to claim 13, wherein the articulated door comprises a plurality of pivotally connected panels and said one edge of the deflector panel is pivotally connected to the uppermost panel of the door unit.

15. A vehicle body according to claim 14, wherein said one edge of the deflector panel is pivotally connected to the uppermost door panel at a position spaced from the uppermost edge thereof.

16. A vehicle body according to claim 14, wherein said one edge of the deflector panel is pivotally connected to the uppermost door panel at a position spaced upwardly from the lowermost edge thereof.

17. A vehicle body according to claim 15, wherein the uppermost door panel and the deflector panel are disposed to partially overlap and partially nest one relative to another when said door is in its open position.

18. A vehicle body according to claim 13, wherein the plane of the deflector panel, when disposed in the closed position, extends upwardly and inwardly relative to the door at an angle which lies between 35° and 55° relative to the plane defined by the door.

19. A vehicle body according to claim 13, further including false ceiling means spaced below the upper walls defining the enclosure and that portion of the guide means extending inwardly from the access opening, one end of the false ceiling means terminating at position spaced from the plane of the access opening and the articulated door when the door is in closed position, the second edge of the deflector panel being disposed above and in close proximity to said one edge of the false ceiling means when the articulated door is in closed position.

20. A vehicle body according to claim 19, wherein the articulated door comprises a plurality of pivotally connected panels and said one edge of the deflector panel is pivotally connected to the uppermost panel of the door in a position spaced upwardly from the pivotal connection of the two uppermost door panels.

21. A closure for a vehicle body access opening comprising an articulated door, means on the door for cooperative sliding engagement with door guide means provided adjacent a vehicle body access opening, a deflector panel having one edge pivotally connected to the upper portion of the door, and slide means disposed upon a second edge of the deflector panel for supporting the deflector panel in sliding engagement with a guide means provided adjacent a vehicle body accesss opening whereby the upper portion of the articulated door is shielded from the contents of the vehicle body when the door is in closed position and the door and deflector panel are freely movable relative to the access opening when the door is not closed.

22. A closure according to claim 21, wherein the articulated door comprises a plurality of pivotally connected panels and said one edge of the deflector panel is pivotally connected to the uppermost panel of the door.

23. A closure according to claim 22, wherein said one edge of the deflector panel is pivotally connected to the uppermost door panel at a position spaced from the uppermost edge thereof.

24. A closure according to claim 22, wherein said one edge of the deflector panel is pivotally connected to the uppermost door panel at a position spaced upwardly from the lowermost edge thereof.

25. A closure according to claim 23, wherein the uppermost door panel and the deflector panel are disposed to partially overlap and partially nest one relative to another when said door is in its open position.

26. A closure according to claim 21, wherein the plane of the deflector panel, when disposed in the closed position, extends upwardly and inwardly relative to the door unit at an angle which lies between 35° and 55° relative to the plane defined by the door.

27. A closure according to claim 21, further including false ceiling means for disposition within a vehicle body adjacent that portion of the guide means extending inwardly from the access opening and have one end thereof fabricated for termination at position spaced from the plane of the access opening and the articulated door when the door is in closed position, the second edge of the deflector panel being constructed for disposition above and in close proximity to said one edge of the false ceiling means when the articulated door is in closed position.

28. A closure according to claim 27, wherein the articulated door comprises a plurality of pivotally connected panels and said one edge of the deflector panel is pivotally connected to the uppermost panel of the door in a position spaced upwardly from the pivotal connection of the two uppermost door panels.

29. A trailer according to claim 12, wherein said first partition member has one edge thereof pivotally connected to an upper portion of said door, the other edge of said first partition member being pivotally and slidably supported on said horizontal track portions.

* * * * *